(12) United States Patent
Howard et al.

(10) Patent No.: US 12,278,384 B2
(45) Date of Patent: Apr. 15, 2025

(54) HIGH CAPACITY CURVED BATTERY CELLS

(71) Applicant: Meta Platforms Technologies, LLC, Menlo Park, CA (US)

(72) Inventors: Jason Howard, Alpharetta, GA (US); Douglas Moskowitz, Rocklin, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 123 days.

(21) Appl. No.: 17/714,981

(22) Filed: Apr. 6, 2022

(65) Prior Publication Data
US 2023/0327255 A1 Oct. 12, 2023

(51) Int. Cl.
| | |
|---|---|
| *H01M 50/213* | (2021.01) |
| *H01M 10/02* | (2006.01) |
| *H01M 50/107* | (2021.01) |
| *H01M 50/244* | (2021.01) |
| *H01M 50/247* | (2021.01) |
| *H01M 50/531* | (2021.01) |

(52) U.S. Cl.
CPC ......... *H01M 50/213* (2021.01); *H01M 10/02* (2013.01); *H01M 50/107* (2021.01); *H01M 50/244* (2021.01); *H01M 50/247* (2021.01); *H01M 50/531* (2021.01); *H01M 2220/30* (2013.01)

(58) Field of Classification Search
CPC ............. H01M 50/213; H01M 50/247; H01M 50/107; H01M 50/531; H01M 50/244; H01M 10/02; H01M 2220/30
See application file for complete search history.

(56) References Cited

U.S. PATENT DOCUMENTS

| | | | | |
|---|---|---|---|---|
| 5,958,618 | A * | 9/1999 | Sullivan | H01M 50/124 |
| | | | | 429/100 |
| 9,837,682 | B1 * | 12/2017 | Nikkhoo | G06F 1/1613 |
| 11,688,905 | B1 * | 6/2023 | Howard | H01M 50/121 |
| | | | | 429/176 |
| 2003/0039883 | A1 | 2/2003 | Notten et al. | |
| 2008/0003505 | A1 | 1/2008 | Wuensch et al. | |
| 2015/0093629 | A1 * | 4/2015 | Sayre | H01M 50/545 |
| | | | | 429/185 |
| 2016/0093849 | A1 | 3/2016 | DeKeuster et al. | |

(Continued)

FOREIGN PATENT DOCUMENTS

| | | |
|---|---|---|
| EP | 3340333 A1 | 6/2018 |
| JP | 2016134199 A | 7/2016 |
| WO | 0182393 A2 | 11/2001 |

OTHER PUBLICATIONS

JP2016134199 translation (Year: 2016).*

(Continued)

*Primary Examiner* — Jane J Rhee
(74) *Attorney, Agent, or Firm* — McDermott Will & Emery LLP

(57) ABSTRACT

Curved battery cells are described. The curved battery cells include first and second curved battery cells having complementary curvatures. The curved battery cells are housed in battery pack housing that has a curvature that complements the curvatures of the curved battery cells. An adhesive layer is be configured to adhere at least one of the first curved battery cell or the second curved battery cell to a curved surface of the battery pack housing.

19 Claims, 5 Drawing Sheets

(56) References Cited

U.S. PATENT DOCUMENTS

2018/0145294 A1    5/2018    Choi et al.
2020/0185664 A1    6/2020    Hu
2023/0327255 A1    10/2023    Howard et al.

OTHER PUBLICATIONS

Invitation to Pay Additional Fees for International Application No. PCT/US2023/017402 mailed Aug. 9, 2023, 13 pages.
EPO—International Search Report and Written Opinion for International Application No. PCT/US2023/017402, mailed Oct. 2, 2023, 16 pages.
USPTO—Non-Final Office Action mailed Dec. 19, 2023 for U.S. Appl. No. 17/714,966, filed Apr. 6, 2022, 14 pages.
1 USPTO—Office Action for related U.S. Appl. No. 17/714,966—mailed Dec. 10, 2024; 15 pages.

\* cited by examiner

Operation A

Operation B

Operation C

Operation D

HIGH CAPACITY CURVED BATTERY CELLS

BACKGROUND

Recent advances in battery technology have enabled computationally powerful portable electronic devices. These devices require considerable amounts of electrical energy. The electrical energy requirement of these devices coupled with a continual demand for smaller and/or lighter devices makes it difficult to adequately power the devices. Curved battery cells are useful means to maximize battery storage capacity and power output. However, existing curved battery cells are available in limited sizes (e.g., thickness, and length), degree of curvature, and configurations, and conventional techniques for manufacturing curved battery cells make their construction complicated, time consuming, and costly.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
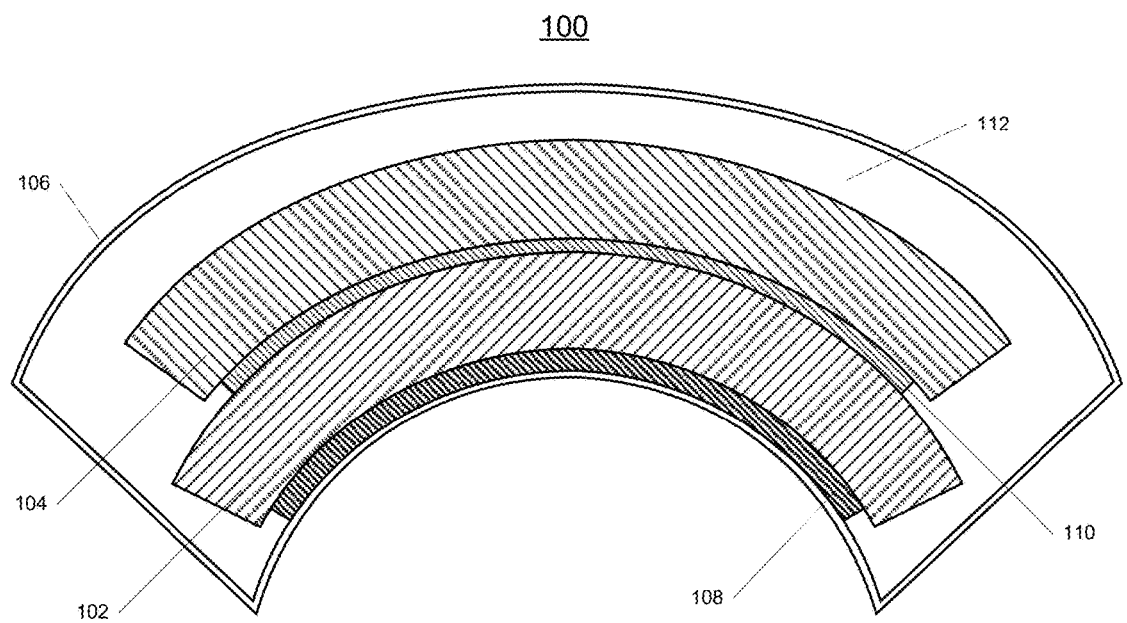
FIG. 1 illustrates a curved multicell pack of stacked curved battery cells in accordance with an example of the present disclosure.

While conventional curved battery cells are suitable for powering portable electronic devices, such as, by way of example and not limitation, extended reality headsets (e.g., augmented reality and/or virtual reality headsets, which may be referred to herein simply as "headsets"), glasses, watches, rings, or other wearable electronic devices. For example, lithium ion batteries are widely used in portable equipment such as laptop computers and cell phones, yet the current battery technology has relatively low storage capacity (e.g., less than 5 amp hours (AH)). Additionally, conventional laptop batteries and cell phone batteries are not suitable for many wearable devices due to the form factors of the wearable devices. For instance, some wearable devices (e.g., glasses, headsets, watches, rings, etc.) have housing or portions thereof that are thin and/or curved and are not sized to Lee& accommodate traditional batteries such as those used in laptops and cell phones. Additionally, in order to improve user comfort, wearable devices often have and weight and space limitations that are not present (or are less restrictive) for laptops and cell phones.

This disclosure describes high capacity curved battery cells and techniques for manufacturing such high capacity curved battery cells. Additionally or alternatively, in some examples, multiple curved battery cells may be incorporated into a curved multicell pack to achieve higher operating voltage and/or capacity. In that case, radii of curvature of the battery cells that are to be stacked can be closely matched, such that the curvatures of the multiple curved battery cells complement each other. It can be very difficult to achieve the required radii matching since conventional curved battery cells have fairly large manufacturing tolerances (i.e., the maximum and minimum measurable dimensions (e.g., thickness, length, and the radius of curvature) of permissible errors in the curved battery cells).

Additionally, curved battery cells can undergo various mechanical changes as the curved battery cell ages. Such mechanical changes may include swelling and/or flattening of the curved battery cell. In the case of multicell curved batteries, mechanical changes of the multiple cells may affect an interface between adjacent curved battery cells and, if not accounted for, can lead to loss of mechanical integrity and/or failure of the curved multicell pack.

Additionally, existing methods of manufacturing curved battery cells involve pressing electrodes of the curved battery cells together into an electrode stack having the desired curvature. This pressing process is difficult to control and if applied to multiple electrode stacks, could damage the curved battery cells. conventional curved battery cells are manufactured by forming a conventional electrode stack. The conventional electrode stack can then be processed into a mold or form to impart a desired curvature to the curved electrode stack. However, a number of issues limit a thickness and length of the electrode stack that can be processed into a curved electrode stack in this manner. The techniques described herein may alleviate some of these issues and enable the formation of thicker and/or higher capacity curved battery cells by, in some examples, using multiple thinner curved electrode stacks.

In some examples, the method of manufacturing a curved multi-cell battery pack includes forming a first curved battery cell that has a first curvature and a second curved battery cell that has a second curvature that complements the first curvature. The first curved battery cell and the second curved battery cell may be housed in a battery pack housing. The battery pack housing may have a third curvature that complements the first curvature and/or the second curvature.

The first curved battery cell and/or the second curved battery cell can be attached to a curved surface of battery pack housing via a first adhesive layer. In some examples, the first curved battery cell can be adhered to the second curved battery cell via a second adhesive layer. Adhesion between adjacent curved battery cells can address the tolerances of the adjacent curved battery cells. Therefore, the second adhesive layer can be thicker than the first adhesive layer. Adhesion between a curved battery cell and a curved surface of the battery pack housing can be configured to maintain the curved shape of the battery pack housing. In this case, the first adhesive layer can be more strong and rigid. In some examples, the first adhesive layer may have a first thickness, and the second adhesive layer may have a second thickness which is thicker than the first thickness. In some examples, the first adhesive layer and the second adhesive layer can be made from the same material. In some examples, the first adhesive and/or the second adhesive can comprise a double sided pressure sensitive adhesive tape, a spray on adhesive, a brushed on adhesive, or the like. In some examples, the first adhesive layer may comprise a first double sided adhesive film tape having a first thickness, and the second adhesive layer may comprise a second double sided adhesive foam tape having a second thickness which is thicker than the first thickness. By way of example and not limitation, suitable adhesive tapes include those having films, foams, and/or other backing/substrate layers made of polyethylene terephthalate (PET) films, polyethylene foams, or polyurethane foams, and having adhesive layers comprising acrylic, tackifier acrylic, synthetic rubber, epoxy, or the like. However, in other examples, adhesive tapes having other backing/substrate layers and/or other adhesives may be used.

In some examples, a gap may be formed in the battery pack housing. In some examples, the gap can be formed between a curved surface of the first curved battery cell and a curved surface of the second curved battery cell. In some examples, the gap can be formed between a curved surface of the battery pack housing, and a curved surface of the first curved battery cell or a curved surface of the second curved battery cell. The gap can be filled with air or a foam. Curved battery cells can swell as the curved battery cells cycle and age. The gap formed in the battery pack housing can accommodate the swelling of the first curved battery cell and/or the second curved battery cell. In some examples, the gap can have a thickness that is at least 10% of the combined thickness of the first curved battery cell and second curved battery cell. In some examples, the gap can have a thickness of about 0.2 mm to about 1 mm. In some examples, the gap can be about 0.5 mm. However, in other examples the gap can be greater or less than this range.

In some examples, the first curved battery cell can have an arc length that is different from the arc length of the second curved battery cell. The differing arc lengths account for the tolerances present in the curved battery cells. Therefore, the adhesion between a curved surface of the first curved battery cell and a curved surface of the second curved battery cell, or the adhesion between a curved surface of the battery pack housing and a curved surface of a curved battery cell can be maintained. In some examples, the first curved battery cell can have a thickness that is different from second curved battery cell. The different thickness can account for the tolerances in the radius of curvature in the curved battery cells. Furthermore, battery capacity can be based at least in part on arc lengths and thicknesses of the curved battery cell. Other factors influencing battery capacity may include width of the curved battery cell, battery chemistry, and the like.

In some examples, the multi-cell curved battery pack can be arranged such that the first curved battery cell is stacked on the second curved battery cell. In some examples, the multi-cell curved battery pack can be arranged such that the first curved battery cell is disposed adjacent to the second curved battery cell in an end-to-end manner. In some examples, the multicell curved battery pack may be arranged with cells stacked on one another and cells disposed adjacent to one another in an end-to-end manner. In some examples, the multi-cell battery pack can be used to power a small and/or light weight computationally powerful portable electronic devices. Suitable devices can include, for example, a wearable electronic device such as an extended reality headset, glasses, a watch, or a smart ring device, to name just a few examples.

In some examples, the first curved battery cell can be manufactured by forming a first electrode stack and a second electrode stack. The first electrode stack includes a first cathode layer stacked on a first anode layer, and a first separator layer stacked therebetween. The second electrode stack includes a second cathode layer stacked on a second anode layer, and a second separator layer stacked therebetween. The first electrode stack and the second electrode stack can be processed separately such that the first electrode stack is pressed into a first curved electrode stack and the second electrode stack is pressed into a second curved electrode stack. Both the first curved electrode stack and the second curved electrode stack can have the first curvature. The first curved electrode stack can be attached to the second electrode stack and hermetically sealed in a first curved cell casing. By way of example and not limitation, battery cell casings as referred to herein may include laminated pouches comprised of layers of metal foil (e.g., aluminum) and one or more polymers (e.g., nylon, polypropylene, polyamide, etc.) laminated with adhesive, metal can housings formed of sheet metal (e.g., steel, stainless steel, aluminum, etc.), as well as other battery cell casings formed of metal, plastic, ceramic, glass, and/or carbon fiber materials.

In some examples, the second curved battery cell can be manufactured in a manner similar as the first curved battery cell. The second curved battery cell can be manufactured by forming a third electrode stack and a fourth electrode stack. The third electrode stack includes a third cathode layer stacked on a third anode layer, and a third separator layer stacked therebetween. The fourth electrode stack includes a fourth cathode layer stacked on a fourth anode layer, and a fourth separator layer stacked therebetween. The third electrode stack and the fourth electrode stack can be processed separately such that the third electrode stack is pressed into a third curved electrode stack and the fourth electrode stack is pressed into a fourth curved electrode stack. Both the third curved electrode stack and the fourth curved electrode stack can have the second curvature. The third curved electrode stack can be attached to the fourth electrode stack and hermetically sealed in a second curved cell casing.

In the foregoing examples, any of the first curved electrode stack, the second curved electrode stack, the third curved electrode stack, and/or the fourth curved electrode stack may include one or more additional cathode layers and one or more additional anode layers, with the additional cathode layer(s) and anode layer(s) being interleaved (e.g., alternatingly stacked on one another). By way of example and not limitation, the first, second, third, and/or fourth curved electrode stacks may have between about 10 and about 50 pairs of cathode and anode layers.

In some examples, a first conductive cell tab, a second conductive cell tab, a third conductive cell tab, and a fourth conductive cell tab can be electrically coupled to the first electrode stack, the second electrode stack, the third electrode stack, and fourth electrode stack, respectively. In some examples, the conductive tabs can be electrically coupled to the electrode stacks before the electrode stacks are processed to form their respective curvatures. In some examples, the first conductive cell tab and the second conductive cell tab can be electrically coupled in a parallel connection. Similarly, the third conductive cell tab and the fourth conductive cell tab can also be electrically coupled in a parallel connection. In some examples, the first conductive cell tab, the second conductive cell tab, the third conductive cell tab, and the fourth conductive cell tab can be electrically coupled to a circuit board. The circuit board can include a protection circuit module (PCM) that contains one or more sensors and/or switches that monitor and manage the safety functions of the curved battery pack (i.e., over-voltage, under-voltage, under-voltage, over-current, over temperature, under temperature, etc.).

Before the first curved cell casing and the second curved cell casing are hermetically sealed, the pouches are filled with an electrolyte. The first curved cell casing and the second curved cell casing can be activated to enable the curved cell casings to perform their electrical energy storage functionality.

In some examples, the first electrode stack and the second electrode stack can be processed to form the first curved electrode stack and the second curved electrode stack by pressing the first electrode stack and the second electrode stack into a mold that has the first curvature. In some examples, the third electrode stack and the fourth electrode stack can be processed to form the third curved electrode stack and the fourth curved electrode stack by pressing the third electrode stack and fourth electrode stack into a mold that has the second curvature. Additionally, the first electrode stack and the second electrode stack can be processed separately before attaching the first curved electrode stack and second curved electrode stack together, and the third electrode stack and the fourth electrode stack can processed separately before attaching the third curved electrode stack and the fourth curved electrode stack together. In some examples, the first curved electrode stack can be adhered to the second curved electrode stack via a first adhesive and the third curved electrode stack can be adhered to the fourth curved electrode stack via a second adhesive. Each curved cell casing contains at least two thin electrode stacks that are joined together. This results in manufacturing thicker battery cells that have higher capacities than was previously possible using conventional battery manufacturing techniques.

In some examples, the first electrode stack and the second electrode stack can have the same or different arc lengths, and the third electrode stack and the fourth electrode stack can have the same or different arc lengths. In some examples, differing arc lengths of the electrode stacks can account for variations in tolerances present in the curved electrode stacks. Therefore, the adhesion between the first curved electrode stack and the second curved electrode stack, and the adhesion between the third curved electrode stack and the fourth curved electrode stack can be accomplished and maintained despite variations in manufacturing tolerances and/or mechanical changes in the electrode stacks with age.

In some examples, each electrode stack can have a thickness that is between about 2 mm and about 6 mm. In some examples, the electrode stacks can have a combined thickness between about 7 mm and 15 mm. In some examples, the first electrode stack and the second electrode stack can have a radius of curvature between about 70 mm and about 110 mm. In some instances, the radius of curvature can be about 70 mm to about 80 mm.

In the instant application, a curved multi-cell battery pack can include a first curved battery cell that has a first curvature and a second curved battery cell that has a second curvature that complements the first curvature. The first curved battery cell and the second curved battery cell can be housed in a battery pack housing. The battery pack housing can have a third curvature that complements the first curvature and/or the second curvature.

The first curved battery cell and/or the second curved battery cell can be attached to a curved surface of battery pack housing via a first adhesive layer. In some examples, the first curved battery cell can be adhered to the second curved battery cell via a second adhesive layer. Adhesion between adjacent curved battery cells can address the tolerances of the adjacent curved battery cells. Therefore, the second adhesive layer can be thicker than the first adhesive layer. Adhesion between a curved battery cell and a curved surface of the battery pack housing can be configured to maintain the curved shape of the battery pack housing. In this case, the first adhesive layer can be more strong and rigid. In some examples, the first adhesive layer and the second adhesive layer can be made from the same material, wherein suitable material for the adhesive layer can include pressure sensitive adhesive tape, spray on adhesive, brushed on adhesive, and/or any of the adhesive layers described herein.

In some examples, the battery pack housing can include a gap. In some examples, the gap can be disposed between a curved surface of the first curved battery cell and a curved surface of the second curved battery cell. In some examples, the gap can be disposed between a curved surface of the battery pack housing, and a curved surface of the first curved battery cell or a curved surface of the second curved battery cell. The gap can be filled with air or a foam. Curved battery cells can swell as the curved battery cells cycle and age. The gap disposed in the battery pack housing can accommodate the swelling of the first curved battery cell and/or the second curved battery cell. In some examples, the gap can have a thickness that is at least 10% of the combined thickness of the first curved battery cell and second curved battery cell. In some examples, the gap can have a thickness of about 0.2 mm to about 1 mm, however other examples the gap may be larger or smaller than this range. In some examples, the gap can be about 0.5 mm.

In some examples, the first curved battery cell can have an arc length that is different from the arc length of the second curved battery cell. The differing arc lengths account for the tolerances present in the curved battery cells. Therefore, the adhesion between a curved surface of the first curved battery cell and a curved surface of the second curved battery cell, or the adhesion between a curved surface of the battery pack housing and a curved surface of a curved battery cell can be maintained. In some examples, the first curved battery cell can have a thickness that is different from second curved battery cell. The different thickness account for the tolerances in the radius of curvature in the curved battery cells. Furthermore, battery capacity can be determined by the arc lengths and the thicknesses of the curved battery cell.

In some examples, the multi-cell curved battery pack can be arranged such that the first curved battery cell is stacked on the second curved battery cell. In another example, the multi-cell curved battery pack can be arranged such that the first curved battery cell is disposed adjacent to the second curved battery cell in an end-to-end manner. In some examples, the multi-cell battery pack can be used to power a small and/or lighter computationally powerful portable electronic device. Suitable devices can be a wearable electronic device such as an extended reality headset, glasses, a watch, or a smart ring device, to name just a few examples.

In some examples, the first curved battery cell can include a first electrode stack and a second electrode stack. The first electrode stack includes a first cathode layer stacked on a first anode layer, and a first separator layer stacked therebetween. The second electrode stack includes a second cathode layer stacked on a second anode layer, and a second separator layer stacked therebetween. Both the first electrode stack and the second electrode stack can have the first curvature. The first curved electrode stack is attached to the second electrode stack and hermetically sealed in a first curved cell casing with an electrolytic material.

In some examples, the second curved battery cell can include a third electrode stack and a fourth electrode stack. The third electrode stack includes a third cathode layer stacked on a third anode layer, and a third separator layer stacked therebetween. The fourth electrode stack includes a fourth cathode layer that is stacked on a fourth anode layer, and a fourth separator layer stacked therebetween. Both the third electrode stack and the fourth electrode stack can have the second curvature. The third curved electrode stack is attached to the fourth electrode stack and hermetically sealed in a second curved cell casing with an electrolyte material.

In some examples, a first conductive cell tab, a second conductive cell tab, a third conductive cell tab, and a fourth conductive cell tab can be electrically coupled to the first electrode stack, the second electrode stack, the third electrode stack, and fourth electrode stack, respectively. In some examples, the first conductive cell tab and the second conductive cell tab can be electrically coupled in a parallel connection. Similarly, the third conductive cell tab and the fourth conductive cell tab can also be electrically coupled in a parallel connection. In some examples, the first conductive cell tab, the second conductive cell tab, the third conductive cell tab, and the fourth conductive cell tab can be electrically coupled to a circuit board. The circuit board can include a protection circuit module (PCM) that contains one or more sensors and/or switches that monitor and manage the safety functions of the curved battery pack (i.e., over-voltage, under-voltage, under-voltage, over-current, over temperature, under temperature, etc.).

In some examples, the first curved electrode stack can be adhered to the second curved electrode stack via a first adhesive and the third curved electrode stack can be adhered to the fourth curved electrode stack via a second adhesive. Each curved cell casing may contain at least two thin electrode stacks that are joined together. This may result in manufacturing thicker battery cells that have higher capacities.

In some examples, the first electrode stack and the second electrode stack can have substantially different arc lengths, and the third electrode stack and the fourth electrode stack can have substantially different arc lengths. The differing arc lengths account for the tolerances present in the curved electrode stacks. Therefore, the adhesion between the first curved electrode stack and the second curved electrode stack, and the adhesion between the third curved electrode stack and the fourth curved electrode stack can be maintained.

In some examples, the first electrode stack and the second electrode stack can have the same arc lengths, and the third electrode stack and the fourth electrode stack can have the same arc lengths. The first electrode stack and the second electrode stack, and the third electrode stack and fourth electrode stack must account tolerances in the radius of curvature in the curved electrode stacks. Therefore, the adhesion between the first electrode stack and the second electrode stack, and the adhesion between the third electrode stack and the fourth electrode stack can be maintained. In some examples, each electrode stack can have a thickness that is between about 2 mm and 6 mm. In some examples, the electrode stacks can have a combined thickness between about 7 mm and 15 mm. In some examples, the first electrode stack and the second electrode stack can have a radius of curvature of about 95 mm to about 80 mm. In some instances, the radius of curvature can be about 70 mm to about 80 mm.

Any or all of the foregoing examples may be implemented alone or in combination with any one or more of the other examples.

FIG. 1 illustrates a curved multicell pack 100 including a first curved battery cell 102 and a second curved battery cell 104 housed in a curved battery housing 106. The first curved battery cell 102, the second curved battery cell 104, and the curved battery housing 106 have curvatures that complement each other. The complementary curvatures allow for a close contact to be maintained at the interfaces between adjacent curved surfaces. In some examples, the first curved battery cell 102 can have an arc length that is shorter, longer, or the same as the arc length of the second curved battery cell 104. The differing arc lengths can be based at least in part on the radius of curvature of the curved multicell pack 100 and/or the size, shape, and configuration of the curved battery housing 106. For instance, in examples in which the arc lengths differ, the differing arc lengths can take advantage of the shape of curved battery housing 106. For instance, in the illustrated example, the second curved battery cell 104 may be longer (have a longer median arc length) than the first curved battery cell 102 because it is disposed radially outward of the first curved battery cell 102. That is, for a curved battery housing having a given radius of curvature, the radially inner curved battery cell (e.g., the first curved battery cell 102 in this example) may have a shorter arc length than one or more curved battery cells disposed radially outward thereof (e.g., the second curved battery cell 104 in this example). This arrangement may result in maximizing an amount of electrode material that fits into the curved battery housing 106. In some examples, the first curved battery cell 102 can be the same or different thickness than the second curved battery cell 104. The different thickness can account for the tolerances in the radius of curvature in the curved battery cells. Additionally or alternatively, the first curved battery cell 102 can be the same or different width (dimension into the page in FIG. 1) than the second curved battery cell 104. For example, the width of the second curved battery cell 104 may be wider or narrower than the first curved battery cell 102. Energy storage capacity can be determined at least in part by arc length, width, and thicknesses of the curved battery cells and in some examples, the arc length, width, and thicknesses of the curved battery cells may be chosen to maximize the storage capacity of the battery cells given a limited volume and form factor of a battery pack housing and/or an electronic device in which the battery cells are to be housed.

A first adhesive 108 can adhere the first curved battery cell 102 to a curved surface of the curved battery housing 106. A second adhesive 110 can adhere opposing curved surfaces of the first curved battery cell 102 and the second curved battery cell 104 together. In some instances, the first adhesive 108 and second adhesive 110 can be made from the same materials. In some instances, the second adhesive 110 can be thicker than the first adhesive 108. In some examples, the second adhesive 110 can account for manufacturing tolerances and variations between battery cells, and can maintain the adhesion between the first curved battery cell 102 and the second curved battery cell. In some instances, the first adhesive 108 can be more rigid than the second adhesive 110 to maintain the curvature of the curved battery housing 106. In some examples, the first adhesive 108 and/or the second adhesive 110 can have a thickness between about 100 μm and about 600 μm, though in other examples the first adhesive 108 and/or the second adhesive 110 can thicker or thinner than the listed range. In some examples, the first adhesive 108 can have a thickness of between about 100 μm and about 200 μm, and the second adhesive 110 can have a thickness of between about 200 μm and about 600 μm.

As the first curved battery cell 102 and the second curved battery cell 104 age and cycle, the batteries can swell. In some examples, the curved battery housing 106 can include a gap 112 between the top (e.g., radially outer) surface of the second curved battery cell 104 and the top (radially outer) wall of the curved battery housing 106. In some examples, the curved battery housing 106 may additionally or alternatively include one or more gaps in other locations (e.g., between a bottom or radially inner surface of the first curved battery cell 102 and a bottom or radially inner surface of the housing and/or in a space between the first curved battery cell 102 and the second curved battery cell. In some examples, the gap 112 may be filled with air, thus creating an air gap, or alternatively with a compressible or compliant foam material, such as polyurethane foam. In some examples, the foam material may be a thermally insulative.

Figure 2:
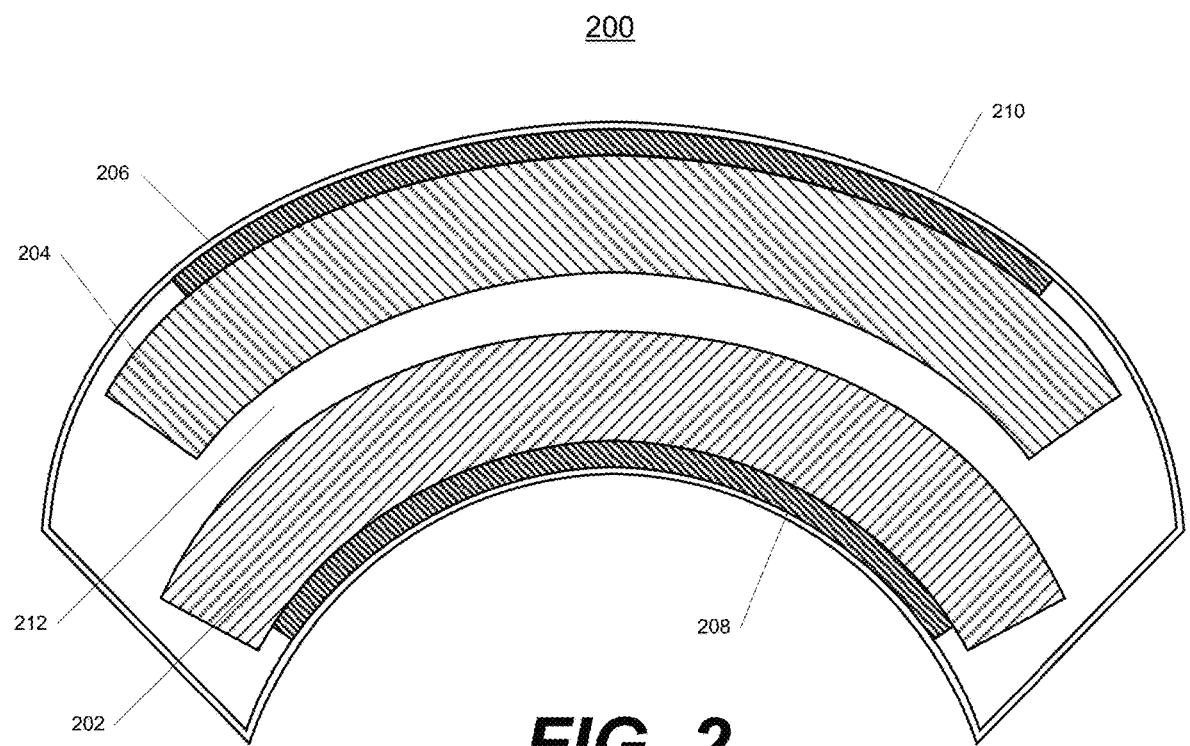
FIG. 2 illustrates a curved multicell pack of stacked curved battery cells in accordance with an example of the present disclosure.

FIG. 2 illustrates a curved multicell pack 200 including a first curved battery cell 202 and a second curved battery cell 204 housed in a curved battery housing 206. The first curved battery cell 202, the second curved battery cell 204, and the curved battery housing 206 have curvatures that complement each other. The complementary curvatures allow for a close contact to be maintained at the interface between a bottom (radially inward) surface of curved battery housing 206 and the first curved battery cell 202 and the interface between a top (radially outward) surface of the curved battery housing 206 and the second curved battery cell 204. In some examples, the first curved battery cell 202 can have an arc length that is the same as, longer than, or shorter than the arc length of the second curved battery cell 204. Additionally or alternatively, the first curved battery cell 202 can be the same or different width (dimension into the page in FIG. 1) than the second curved battery cell 204. For example, the width of the second curved battery cell 204 may be wider or narrower than the first curved battery cell 202. The differing arc lengths and/or widths can be based at least in part on the radius of curvature of the curved multicell pack 200 and/or the size, shape, and configuration of the curved battery housing 206. For instance, in examples in which the arc lengths and/or widths differ, the differing arc lengths and/or widths can take advantage of the shape of the curved battery housing 206. For instance, in the illustrated example, the second curved battery cell 204 may be longer (e.g., have a longer median arc length) than the first curved battery cell 202 by virtue of being disposed radially outward of the first curved battery cell 202. That is, for a curved battery housing having a radius of curvature, the radially inner curved battery cell (e.g., the first curved battery cell 202 in this example) may have a shorter arc length than one or more curved battery cells disposed radially outward thereof (e.g., the second curved battery cell 204 in this example). This arrangement may result in maximizing an amount of electrode material that fits into the curved battery housing 106. In some examples, the first curved battery cell 202 can be the same or different thickness than the second curved battery cell 204. The different thickness can account for the tolerances in the radius of curvature in the curved battery cells. As discussed above, energy storage capacity can be determined at least in part by arc length, width, and thicknesses of the curved battery cells and in some examples, the arc length, width, and thicknesses of the curved battery cells may be chosen to maximize the storage capacity of the battery cells given a limited volume and form factor of a battery pack housing and/or an electronic device in which the battery cells are to be housed.

A first adhesive 208 can adhere the first curved battery cell 202 to a first, radially inward curved surface of the curved battery housing 206. A second adhesive 210 can adhere the second curved battery cell 204 to a second, radially outward curved surface of the curved battery housing 206. In some instances, the first adhesive 208 and second adhesive 210 can be made from the same materials. In some instances, the first adhesive 208 and/or the second adhesive 210 can be made of a strong rigid material that can maintain the respective curved battery cells in contact with the curvature of the curved battery housing 206.

As the first curved battery cell 202 and the second curved battery cell 204 age and cycle, the battery cells can swell. In some examples, the curved battery housing 206 can include a gap 212 between the first curved battery cell 202 and the second curved battery cell 204. The gap 212 may be filled with air, thus creating an air gap, or alternatively with a foam material such as any of the foam materials described herein.

Figure 3:
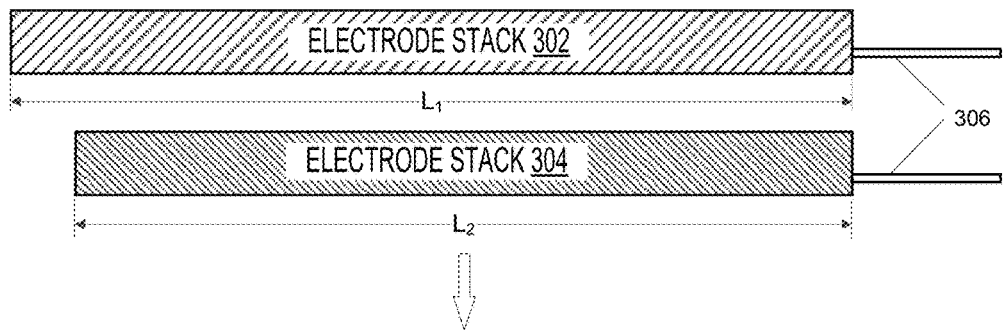
FIG. 3 illustrates a process for manufacturing a curved battery cell in accordance with an example of the present disclosure.
Figure 3:
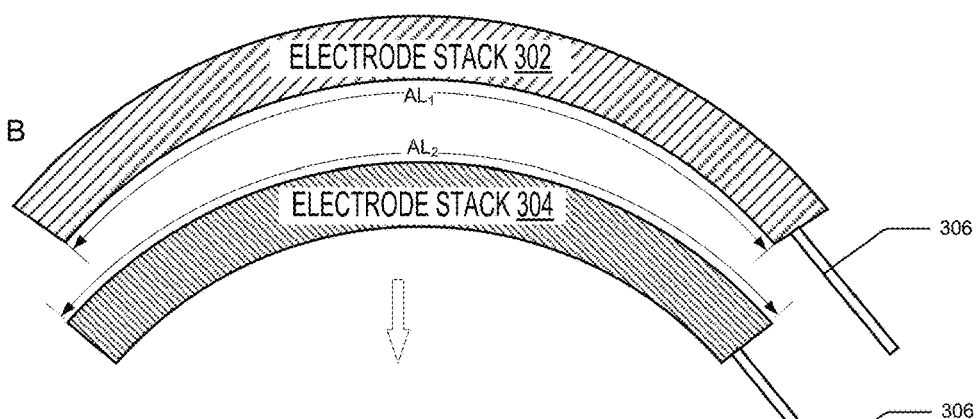
Figure 3:
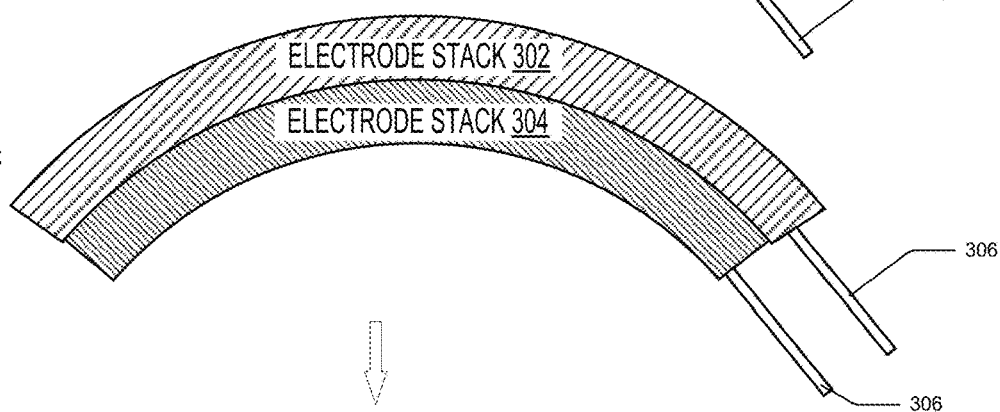
Figure 3:
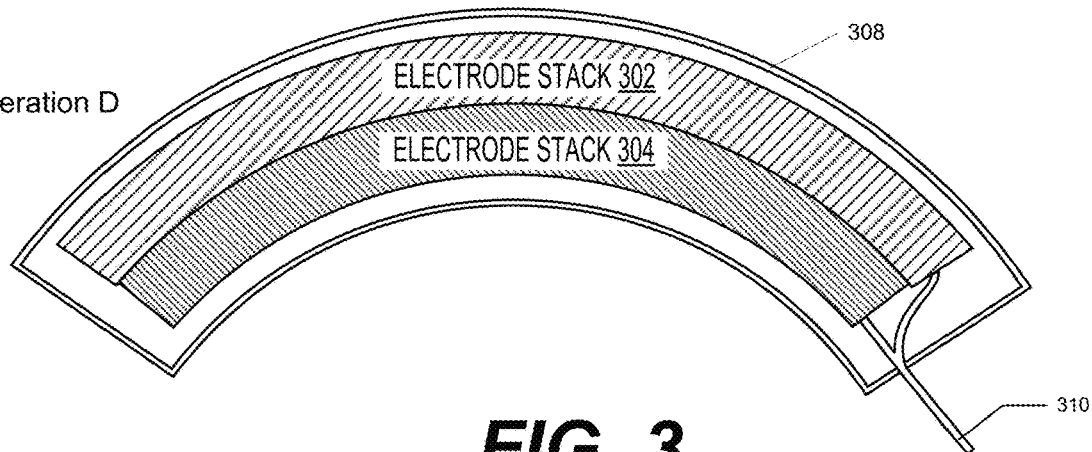

FIG. 3 schematically illustrates an example method 300 of manufacturing a curved battery cell. The curved battery cell can include two or more electrode stacks. For ease of illustration, FIG. 3 illustrates a simple example including only two electrode stacks, namely a first electrode stack 302 and a second electrode stack 304. However, in other examples, three or more electrode stacks may be combined to form multicell curved battery packs according to this disclosure. In the illustrated example, the first electrode stack 302 has a first length $L_1$ and the second electrode stack 304 has a second stack $L_2$.

During a first operation (Operation A), each electrode stack (e.g., 302, 304, etc.) can be made by forming a stack including one or more anode layers and one or more cathode layers separated by respective separator layers. In some examples, different electrode stacks can have different lengths. For instance, in the illustrated example, the length $L_1$ of the first electrode stack 302 may be longer than the length $L_2$ of the second electrode stack 304 so that after they are bent (as described further below) their respective ends will be substantially aligned. Additionally, the length of the anode layer of the first electrode stack 302 can be longer than the adjacent cathode layer at the interface between the first electrode stack 302 and the second electrode stack 304. However, in other examples, the lengths of the respective electrode stacks may be substantially equal prior to bending. In some examples, the length $L_1$ of the first electrode stack 302 can be determined by Formula 1, where $L_1$ represents the length of the first electrode stack 302, $L_2$ represents the length of the second electrode stack 304, $R_2$ represents the inner radius of curvature of second electrode stack 304, and $T_2$ represents the thickness of second electrode stack 304.

Formula 1:

$$L_1 = L_2 \times \frac{(R_2 + T_2)}{R_2} \qquad (1)$$

Each electrode stack can include conductive cell tabs 306. The conductive cell tabs 306 can be configured to be electrically coupled to a circuit board (not shown). The circuit board can include a protection circuit module (PCM) that contains one or more sensors and/or switches that monitor and manage the safety functions of the curved battery pack (i.e., over-voltage, under-voltage, under-voltage, over-current, over temperature, under temperature, etc.).

During a second operation (Operation B), the electrode stacks (e.g., the first electrode stack 302 and the second electrode stack 304) are individually processed to impart curvatures. In some examples, the curvatures imparted to the individual electrode stacks can be the same or complementary. In some examples, the electrode stacks can be processed by pressing the electrode stacks into a mold (not shown) that has the desired curvature. The electrode stacks can be pressed into the mold at temperature below the melting point of the separator layer disposed between the anode layer and the cathode layer. In some examples, the electrode stack is processed by heat pressing the electrode stack at a temperature between about 50° C. to about 130° C.

During a third operation (Operation C), the individual curved electrode stacks (e.g., 302, 304, etc.) can be combined or coupled together such that the curvatures complement each other. For example, a concave inner radius of curvature of the first electrode stack 302 may be substantially the same as a convex outer radius of curvature of the second electrode stack 304, so that they nest together with the concave inner radius of curvature of the first electrode stack 302 against the convex outer radius of curvature of the second electrode stack 304. In some examples, an adhesive may be disposed between the individual electrode stacks. The individual electrode stacks may be pressed together under the same or different conditions as used to impart the curvature to the individual electrode stacks in Operation B. In some examples, a force used to press the electrode stacks together in Operation C may be less than that used to impart the curvature to the individual electrode stacks in Operation B.

In some examples, the electrode stacks can have different lengths. For example, as shown in the example of FIG. 3, the first electrode stack 302 can have a first length which is longer than a second length of the second electrode stack 304. Thus, when the first electrode stack 302 is coupled to the second electrode stack 304 in Operation C, the ends of the first electrode stack 302 and second electrode stack 304 are substantially aligned. That is, because the first electrode stack 302 is disposed radially outward of the second electrode stack 304 in this example, an arc length of the first electrode stack 302 may be longer than an arc length of the second electrode stack 304. Specifically, as shown in Operation 2 of FIG. 3, a first arc length $AL_1$ of the inner radius of the first electrode stack 302 is substantially equal to a second arc length $AL_2$ of the outer radius of the second electrode stack 304. Thus, the length $L_1$ of the first electrode stack 302 relative to the length $L_2$ of the second electrode stack 304 may be based at least in part on the radius of curvature to be imparted to the respective electrode stacks.

The thicknesses of the individual electrode stacks may be the same or different. In some examples, each individual electrode stack can be at least 1 mm thick and at most 10 mm thick. In some cases, each individual electrode stack can be about 2 mm to about 8 mm thick. In some examples, each individual electrode stack may be less than 6 mm thick. In some examples, the combined electrode stacks (composed of multiple individual electrode stacks) can have a thickness of at least 2 mm Depending on the thickness of the individual electrode stacks and the number of electrode stacks combined, combined electrode stacks according to this disclosure can be made that are 2 mm-20 mm thick, or even thicker (e.g., 25 mm, 30 mm, 40 mm, 50 mm, or thicker), if more than two electrode stacks are combined.

During a fourth operation (Operation D), the combined electrode stack can then be inserted and hermetically sealed in a curved cell casing 308. Prior to sealing the cell casing 308, an electrolytic solution can be included in the cell casing. The conductive cell tabs 306 may be combined to provide an exterior conductive tab 310, which protrudes from/through the cell casing for electrically connecting the curved battery cell to one or more circuits or other electronic components. Additionally, in some examples, one or more other conventional backend processes, such as formation, degassing, aging, etc. can be performed to prepare the curved battery cell for operation.

Figure 4A:
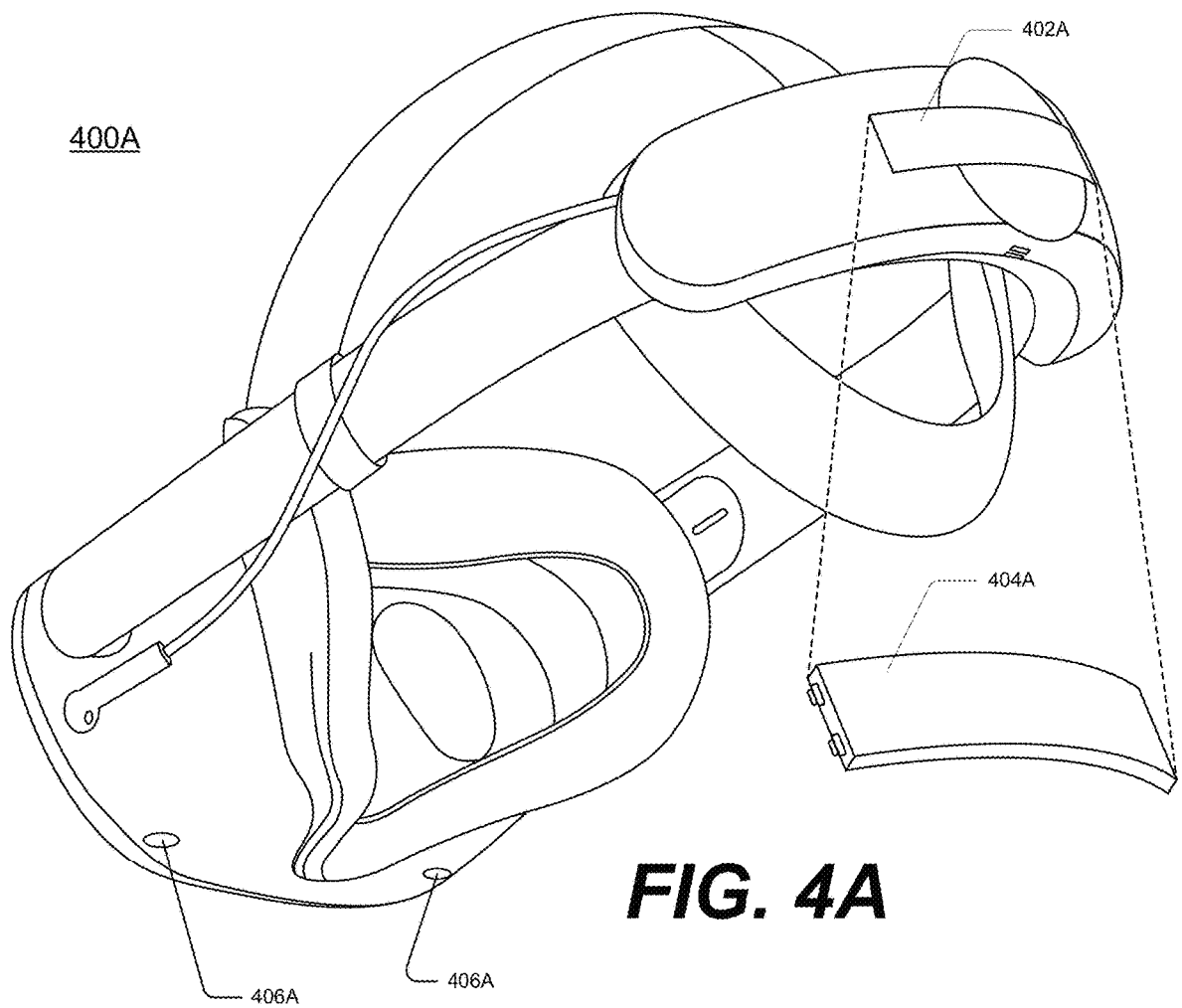
FIGS. 4A and 4B illustrate example electronic devices that include curved multicell packs in accordance with examples of the present disclosure.
Figure 4B:
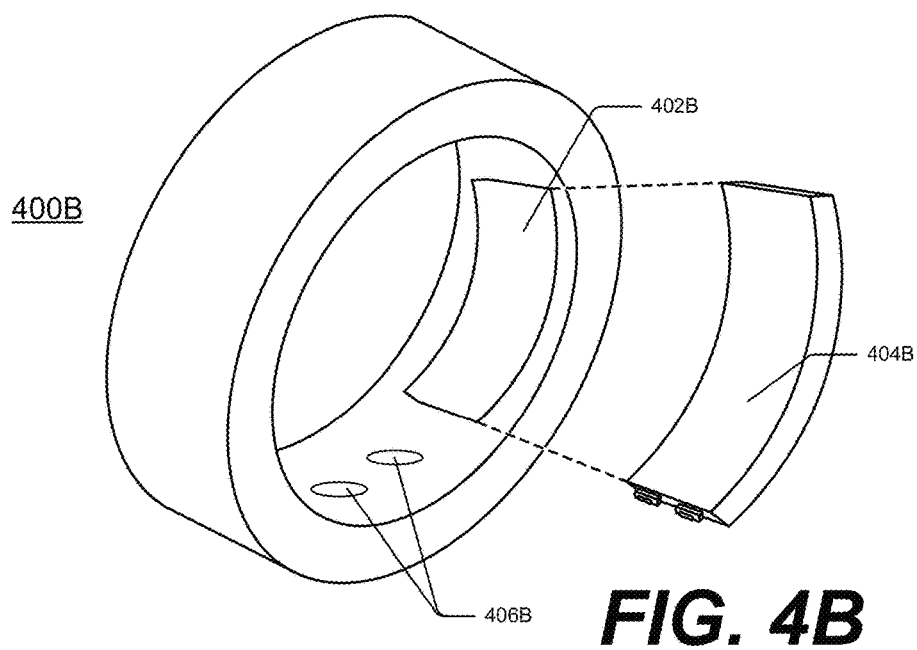

FIGS. 4A and 4B illustrate example wearable devices including curved multicell battery packs according to this disclosure. FIG. 4A illustrates an example extended reality wearable headset device 400A, which includes a housing 402A. A curved multicell battery pack 404A is enclosed in or coupled to housing 402A. In some examples, the curved multicell battery pack 404A may form a portion of an exterior of the housing 402A. The extended reality wearable headset device 400A may also include one or more sensors 406A, such as image sensors, time of flight sensors, sonar sensors, inertial measurement sensors, or the like, to sense conditions of extended reality wearable headset device 400A, a wearer of the headset, and/or an environment surrounding the headset. FIG. 4B illustrates an example smart ring device 400B, which includes a housing 402B. The curved multicell battery pack 404B is enclosed in, coupled to, and/or forms part of the housing 402B. In this example, the smart ring device 400B may include one or more sensors 406B, such as heart rate monitor sensors, temperature sensors, oxygen sensors, inertial measurement unit, or the like. The curved multicell battery packs 404A and 404B may provide power to the sensors 406A and 406B and other electronic components (e.g., processors, memory, radios, etc.) of the extended reality wearable headset device 400A and the smart ring device 400B, respectively.

Curved multicell battery packs such as those shown in FIGS. 4A and 4B may also be used in other electronic devices. Since the curved multicell battery packs described herein allow for an increased thickness of the curved batteries they are able to store more energy (i.e., they have a higher storage capacity) than existing curved batteries. Accordingly, portable electronic devices using curved multicell battery packs as described herein may be configured to operate longer and/or perform more energy intensive operations than portable electronic devices that use conventional curved battery cell packs.

Figure 5:
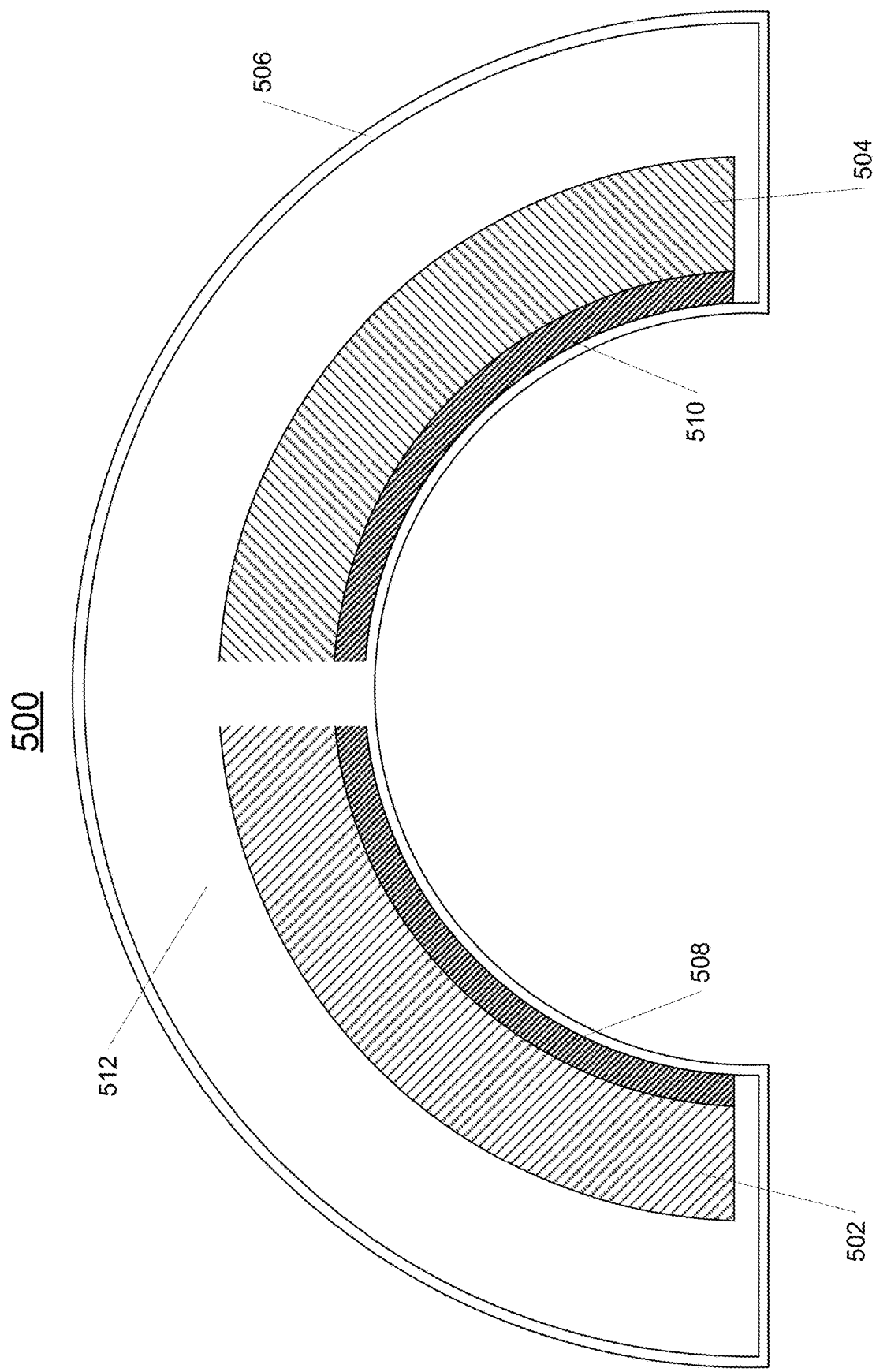
FIG. 5 illustrates a curved multicell pack of curved battery cells configured in an end-to-end manner in accordance with an example of the present disclosure.

FIG. 5 illustrates a curved multicell pack 500 including a first curved battery cell 502 and a second curved battery cell 504 housed in a curved battery housing 506. The first curved battery cell 502 and the second curved battery cell 504 complement the curvature of the curved battery housing 506. The complementary curvatures allow for a close contact to be maintained at the interfaces between adjacent curved surfaces of the first curved battery cell 502, the second curved battery cell 504, and the curved battery housing 506. A first adhesive 508 can adhere the first curved battery cell 502 to a curved surface of the curved battery housing 506. A second adhesive 510 can adhere the second curved battery cell 504 to the curved surface of the curved battery housing 506. In some instances, the first adhesive 508 and second adhesive 510 can be made from the same materials. In some instances, the first adhesive 508 and second adhesive 510 can be made from rigid adhesive material. The rigidness is configured to maintain the curvature of the curved battery housing 506.

As the first curved battery cell 502 and the second curved battery cell 504 age and cycle, the batteries can swell. Therefore, the curved battery housing 506 can include a gap 512 between the top surfaces of the first curved battery cell 502 and the second curved battery cell 504, and the top wall of the curved battery housing 506. The gap 512 may be filled with air, thus creating an air gap, or alternatively with a foam material such as any of the foam materials described herein.

Unlike the curved battery cells of FIGS. 1 and 2 where the first curved battery cell is stacked onto the second curved battery cell, in this example, the curved battery cells are arranged in an end-to-end manner.

Figure 6:
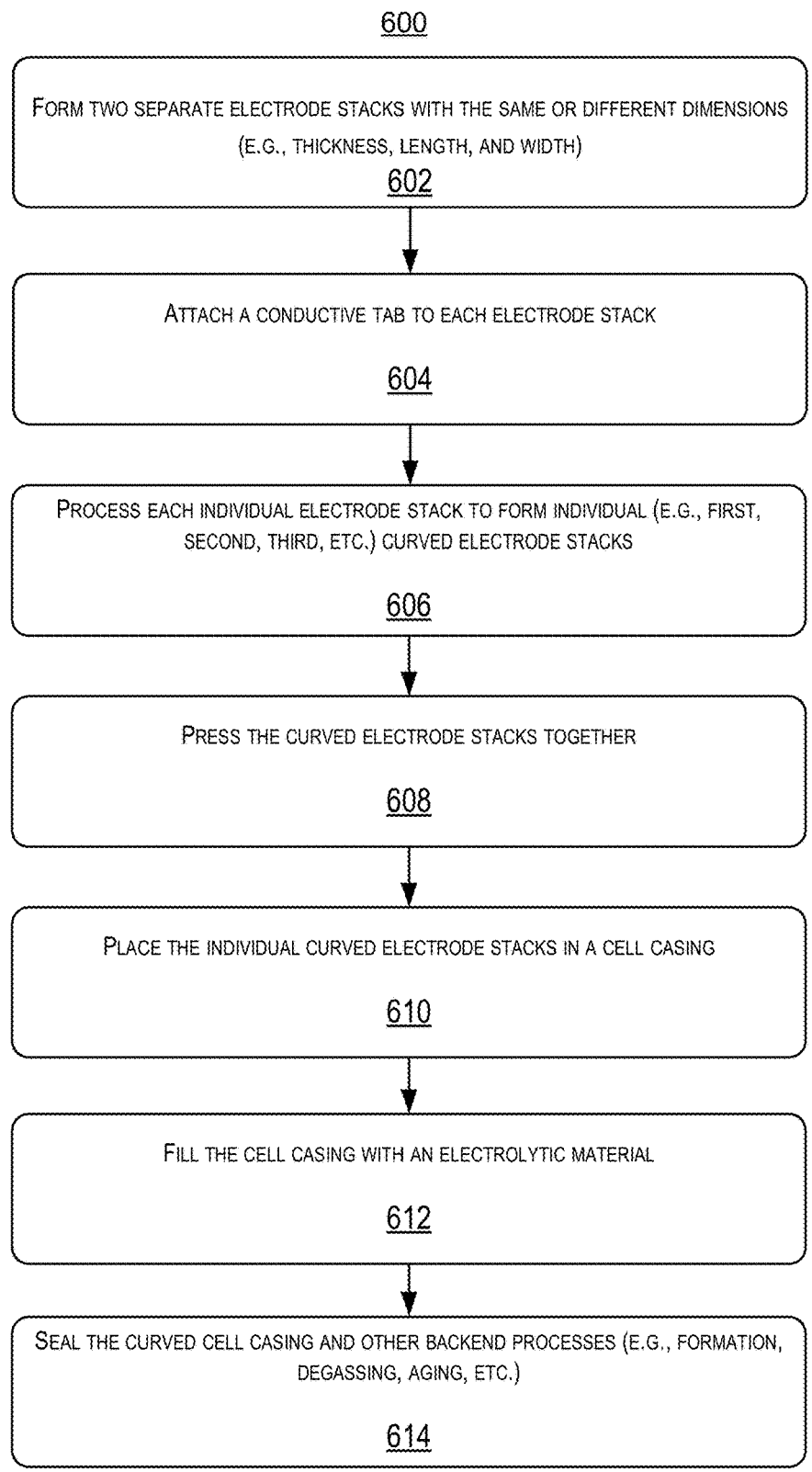
FIG. 6 is a flowchart illustrating an example method to manufacturing a curved battery cell.

FIG. 6 illustrates an example process 600 for manufacturing a curved battery cell using the techniques described herein. The example process 600 is described with reference to the example method of FIG. 3. However, the example process 600 is not limited to being performed using the method of FIG. 3 and may be implemented using methods other than those described herein. The process 600 described herein represents a sequence of operations that can be implemented in the method of manufacturing the curved battery cell.

An operation 602 may include forming two separate electrode stacks with slightly different dimensions. The slightly different dimensions can be the thicknesses, the widths, and/or the lengths of the separate electrode stacks. In some examples, the separate electrode stacks can have lengths that are different from one another. The differing lengths account for the tolerances present in electrode stacks when the electrode stacks are formed into curved electrode stacks. Therefore, the adhesion between curved surfaces of the curved electrode stacks can be maintained. In some examples, the separate electrode stacks can have different thicknesses. The different thickness can account for the tolerances in the radius of curvature in the curved electrode stacks. In some examples, the separate electrode stacks can have a thickness of at least 10 mm. Furthermore, battery capacity can be determined by lengths and thicknesses of the curved battery cell.

An operation 604 includes attaching conductive tabs to each electrode stack. The conductive tabs can be electrically coupled to the separate electrode stacks before the electrode stacks are processed to form their respective curvatures. In some examples, the conductive cell tabs of the separate electrode stacks can be electrically coupled in a parallel connection. In some examples, the conductive cell tabs can be electrically coupled to a small circuit board. The small circuit board can include a protection circuit module (PCM) that contains emergency switches that manages the basic safety functions of the curved battery pack (i.e., over-voltage, under-voltage, under-voltage, over-current, over temperature, and under temperature).

An operation 606 includes processing the electrode stack to form curved electrode stacks. The electrode stacks can be individually processed to form complementary curvatures. In some examples, the electrode stacks can be processed by pressing the individual electrode stacks into a mold that has the desired curvature. An operation 608 includes pressing the curved electrode stacks together. The curved electrode stacks can be pressed together to form a single stack such that the curvatures complement each other. Optionally, the individual curved electrode stacks can be adhered to each other via one or more adhesive layers disposed between adjacent electrode stacks. An operation 610 includes placing the pressed curved electrode stacks in a curved pouch package. The combined curved electrode stacks allow for the manufacturing of thicker cells with higher capacity. Operations 612 and 614 include backend processes that turn the electrode stacks into batteries. An operation 612 includes filling the curved pouch package with an electrolytic material. Suitable electrolytic material can include, for example, a solution of lithium salts in one or more organic solvents. By way of example and not limitation, lithium salts that can be used include lithium hexafluorophosphate ($LiPF_6$) and lithium tetrafluoroborate ($LiBF_4$). Organic solvents can include carbonates (such as ethyl carbonate, propyl carbonate, diethyl carbonate, dimethyl carbonate, and ethyl methylcarbonate) and/or esters (such as methylpropionate, ethylpropionate, ethyl acetate, and methyl butyrate). An operation 614 includes hermetically sealing the cell casing and applying one or more additional backend processes such as battery formation, degassing, and/or aging.

CONCLUSION

Although the discussion above sets forth example implementations of the described techniques, other architectures may be used to implement the described functionality, and are intended to be within the scope of this disclosure. For example, while the curved battery cells shown and described herein are shown to be simple arcs, in other examples, different curved geometries are also contemplated. For instance, the techniques described herein can be used to manufacture battery cells having S-curve geometries, domed geometries (e.g., curved in two dimensions), or any other geometry having curvature on one or more directions.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A device, comprising:
   a first curved battery cell having a first curvature, the first curved battery cell including a first electrode stack with a first cell tab electrically coupled to and extending from the first electrode stack, and including a second electrode stack with a second cell tab electrically coupled to and extending from the second electrode stack;
   a first cell casing, wherein the first cell casing is formed of a metal and the first electrode stack and the second electrode stack are sealed in the first cell casing;
   a single combined cell tab including the first cell tab and the second cell tab, wherein the first cell tab is electrically coupled with the second cell tab inside of the first cell casing to provide the single combined cell tab, and wherein the single combined cell tab protrudes from or through the first cell casing;
   a battery pack housing that houses the first curved battery cell and a second curved battery cell having a second curvature, the second curvature complementary to the first curvature, wherein the battery pack housing includes a curved surface having a third curvature, the third curvature complementary to at least one of the first curvature or the second curvature; and
   a first adhesive layer adhering the first curved battery cell to the second curved battery cell.

2. The device of claim 1, wherein:
   the first electrode stack includes a first cathode layer and a first anode layer, wherein the first cathode layer is stacked on the first anode layer, and a first separator layer is interposed between the first cathode layer and the first anode layer;
   the second electrode stack includes a second cathode layer and a second anode layer, wherein the second cathode layer is stacked on the second anode layer, and a second separator layer is interposed between the second cathode layer and the second anode layer; and
   the second curved battery cell comprises:

a third electrode stack including a third cathode layer and a third anode layer, wherein the third cathode layer is stacked on the third anode layer, and a third separator layer is interposed between the third cathode layer and the third anode layer; and a fourth electrode stack including a fourth cathode layer and a fourth anode layer, wherein the fourth cathode layer is stacked on the fourth anode layer, and a fourth separator layer is interposed between the fourth cathode layer and the fourth anode layer.

3. The device of claim 2, wherein:
the first electrode stack and the second electrode stack are hermetically sealed in the first cell casing, the first cell casing including the first curvature, and
the third electrode stack and the fourth electrode stack are hermetically sealed in a second cell casing, the second cell casing including the second curvature.

4. The device of claim 2, wherein:
the first electrode stack includes a first length, the second electrode stack includes a second length, and the first length is different from the second length, and
the third electrode stack includes a third length, the fourth electrode stack includes a fourth length, and the third length is different from the fourth length.

5. The device of claim 2, wherein:
the first electrode stack includes a first length, the second electrode stack includes a second length, and the first length is substantially the same as the second length, and
the third electrode stack includes a third length, the fourth electrode stack includes a fourth length, and the third length is substantially the same as the fourth length.

6. The device of claim 2, wherein each of the first electrode stack, the second electrode stack, the third electrode stack, and the fourth electrode stack is at least 1 mm thick and at most 10 mm thick.

7. The device of claim 1, wherein the first curved battery cell has a first length, the second curved battery cell has a second length, and the first length is different from the second length.

8. The device of claim 1, wherein the first curved battery cell has a first thickness, the second curved battery cell has a second thickness, and the first thickness is different from the second thickness.

9. The device of claim 1, further comprising a second adhesive layer that adheres the first curved battery cell to the second curved battery cell.

10. The device of claim 9, wherein the first adhesive layer is more rigid than the second adhesive layer.

11. The device of claim 9, wherein the second adhesive layer is thicker than the first adhesive layer.

12. The device of claim 1, further comprising a gap in the housing between at least one of:
a curved surface of the first curved battery cell and a curved surface of the second curved battery cell; or
the curved surface of the housing and at least one of the first curved battery cell or the second curved battery cell.

13. The device of claim 1, wherein:
the first curved battery cell is stacked onto the second curved battery cell; or
the first curved battery cell is arranged with the second curved battery cell in an end-to-end manner.

14. The device of claim 1, wherein the device comprises at least one of a battery pack or a wearable electronic device.

15. A curved battery cell comprising:
a first curved electrode stack including:
a first cell tab electrically coupled to and extending from the first curved electrode stack,
a first curved cathode layer, and
a first curved anode layer, wherein the first curved cathode layer is stacked on the first curved anode layer, and a first separator layer is interposed between the first curved cathode layer and the first curved anode layer;
a second curved electrode stack including:
a second cell tab electrically coupled to and extending from the second curved electrode stack,
a second curved cathode layer, and
a second curved anode layer, wherein the second curved cathode layer is stacked on the second curved anode layer, and a second separator layer is interposed between the second curved cathode layer and the second curved anode layer; and
a single combined cell tab including the first cell tab and the second cell tab, wherein the first cell tab is electrically coupled with the second cell tab inside of a curved cell casing to provide the single combined cell tab, and wherein the single combined cell tab protrudes from or through the curved cell casing, and the curved cell casing is made of a metal.

16. The curved battery cell of claim 15, wherein the first curved electrode stack includes a first length, the second curved electrode stack includes a second length, and the first length is different from the second length.

17. The curved battery cell of claim 15, wherein the first curved electrode stack includes a first length, the second curved electrode stack includes a second length, and the first length is substantially the same as the second length.

18. The curved battery cell of claim 15, wherein the first curved electrode stack and the second curved electrode stack are hermetically sealed in the curved cell casing, the curved cell casing including a first curvature.

19. The curved battery cell of claim 15, wherein each of the first curved electrode stack and the second curved electrode stack is at least 1 mm thick and at most 10 mm thick.

\* \* \* \* \*